United States Patent
Kelly

(10) Patent No.: US 10,197,587 B2
(45) Date of Patent: Feb. 5, 2019

(54) DEVICE AND METHOD FOR USING TIME RATE OF CHANGE OF SENSOR DATA TO DETERMINE DEVICE ROTATION

(71) Applicant: mCube Inc., San Jose, CA (US)

(72) Inventor: Joseph M. Kelly, Center Point, IA (US)

(73) Assignee: mCube Inc., San Jose, CA (US)

( * ) Notice: Subject to any disclaimer, the term of this patent is extended or adjusted under 35 U.S.C. 154(b) by 549 days.

(21) Appl. No.: 14/550,888

(22) Filed: Nov. 21, 2014

(65) Prior Publication Data

US 2015/0149111 A1 May 28, 2015

Related U.S. Application Data

(60) Provisional application No. 61/907,911, filed on Nov. 22, 2013.

(51) Int. Cl.
*G01C 25/00* (2006.01)
*G01C 19/00* (2013.01)
(Continued)

(52) U.S. Cl.
CPC ............... *G01P 3/00* (2013.01); *G01C 19/00* (2013.01)

(58) Field of Classification Search
CPC ............ G01C 19/5776; G01C 19/5712; G01C 19/5762; G01C 19/5783; G01C 21/12;
(Continued)

(56) References Cited

U.S. PATENT DOCUMENTS 6,421,622 B1    7/2002    Horton et al.
7,210,236 B2    5/2007    Sato et al.
(Continued)

FOREIGN PATENT DOCUMENTS

CN    101033973 A    9/2007
CN    201311294 Y    9/2009
(Continued)

OTHER PUBLICATIONS

Non-Final Office Action received for U.S. Appl. No. 13/760,014, dated Jul. 26, 2018. 23 pages.
(Continued)

*Primary Examiner* — Jonathan Han
(74) *Attorney, Agent, or Firm* — Kilpatrick Townsend & Stockton LLP

(57) ABSTRACT

A computer-implemented method for determining rotational rate of a computer system programmed to perform the method includes determining in a physical perturbation sensor in the computer system, a plurality of instantaneous field measurements with respect to a reference field, at a first time and a second time, determining in the computer system, a plurality of rates of change associated with the physical perturbation sensor in response to the plurality of instantaneous field measurements at the first time and the second time, determining in the computer system, a plurality of estimated rotational rates for the computer system in response to the plurality of rates of change, and performing in the computer system, an operation in response to the plurality of estimated rotational rates.

10 Claims, 7 Drawing Sheets

(51) Int. Cl.
*G01P 3/00* (2006.01)
*G01P 15/08* (2006.01)

(58) Field of Classification Search
CPC .... G01C 21/165; G01C 25/005; G01C 19/00; G01R 33/0206; G01R 33/093; G01R 33/096; B81B 2201/0242; G01P 3/00
USPC ........ 257/E29.323, 421, 422, 423, 425, 426, 257/427; 438/3
See application file for complete search history.

(56) References Cited

U.S. PATENT DOCUMENTS

| | | | |
|---|---|---|---|
| 7,578,189 | B1 | 8/2009 | Mehregany |
| 8,676,528 | B2 | 3/2014 | Almalki et al. |
| 8,904,410 | B2 | 12/2014 | Kelly |
| 9,052,203 | B2 | 6/2015 | Kelly |
| 9,179,248 | B2 | 11/2015 | Kelly et al. |
| 9,179,266 | B2 | 11/2015 | Kelly |
| 9,594,095 | B2 | 3/2017 | Bhandari et al. |
| 2002/0065626 | A1 | 5/2002 | McCall et al. |
| 2003/0065467 | A1 | 4/2003 | Schuh et al. |
| 2003/0135327 | A1* | 7/2003 | Levine ................. G01C 21/165 701/500 |
| 2005/0184884 | A1 | 8/2005 | Kim et al. |
| 2009/0145195 | A1 | 6/2009 | Buttmann et al. |
| 2010/0242603 | A1 | 9/2010 | Miller et al. |
| 2011/0029275 | A1 | 2/2011 | Kennedy et al. |
| 2011/0191024 | A1* | 8/2011 | DeLuca ................ G01C 21/28 701/472 |
| 2011/0265574 | A1 | 11/2011 | Yang |
| 2011/0288805 | A1 | 11/2011 | Dejnabadi et al. |
| 2011/0301900 | A1 | 12/2011 | Patel et al. |
| 2011/0307171 | A1 | 12/2011 | Waite |
| 2011/0313650 | A1* | 12/2011 | Tome .................... G01C 21/16 701/505 |
| 2012/0136573 | A1* | 5/2012 | Janardhanan ........ G01C 21/165 701/512 |
| 2012/0136579 | A1 | 5/2012 | Janardhanan et al. |
| 2012/0203453 | A1 | 8/2012 | Lundquist et al. |
| 2012/0215477 | A1 | 8/2012 | Tuck et al. |
| 2013/0018582 | A1* | 1/2013 | Miller .................... G01C 17/38 701/501 |
| 2013/0090881 | A1 | 4/2013 | Janardhanan et al. |
| 2013/0110450 | A1* | 5/2013 | Kulik .................... G01C 17/38 702/141 |
| 2013/0124127 | A1 | 5/2013 | Ahuja et al. |
| 2013/0214357 | A1 | 8/2013 | Van Der et al. |
| 2013/0214367 | A1 | 8/2013 | Van Der et al. |
| 2013/0218505 | A1 | 8/2013 | Bhandari et al. |
| 2014/0012531 | A1 | 1/2014 | Bhandari et al. |
| 2014/0025330 | A1 | 1/2014 | Bhandari |
| 2014/0343885 | A1 | 11/2014 | Abrahamsson et al. |
| 2015/0149111 | A1 | 5/2015 | Kelly |

FOREIGN PATENT DOCUMENTS

| | | |
|---|---|---|
| CN | 103246366 A | 8/2013 |
| EP | 1953513 A1 | 8/2008 |
| JP | 2009025012 A | 2/2009 |
| KR | 20120126120 A | 11/2012 |
| WO | 2011091083 A1 | 7/2011 |
| WO | 2011123149 A1 | 10/2011 |

OTHER PUBLICATIONS

Non-Final Office Action received for U.S. Appl. No. 13/940,199, dated Aug. 11, 2017. 22 pages.
Final Office Action received for U.S. Appl. No. 13/940,199, dated Jan. 11, 2018. 19 pages.
Non-Final Office Action received in U.S. Appl. No. 13/760,014, dated Oct. 23, 2015. 26 pages.
Final Office Action received in U.S. Appl. No. 13/760,014, dated Feb. 24, 2016. 25 pages.
Non-Final Office Action received in U.S. Appl. No. 13/760,014, dated Oct. 12, 2016. 13 pages.
Final Office Action received in U.S. Appl. No. 13/760,014, dated Mar. 10, 2017. 12 pages.
Non-Final Office Action received in U.S. Appl. No. 13/760,014, dated Aug. 16, 2017. 28 pages.
Final Office Action received in U.S. Appl. No. 13/760,014, dated Jan. 25, 2018. 20 pages.
*Electric Power Group* v. *Alstom.* Aug. 1, 2016, 12 Pages.
U.S. Appl. No. 13/761,748, Non-Final Office Action dated Feb. 26, 2015, 12 pages.
U.S. Appl. No. 13/761,748, Notice of Allowance dated Sep. 16, 2015, 9 pages.
U.S. Appl. No. 13/936,117, Final Office Action dated Aug. 5, 2016, 7 pages.
U.S. Appl. No. 13/936,117, Non-Final Office Action dated Mar. 29, 2016, 11 pages.
U.S. Appl. No. 13/936,117, Notice of Allowance dated Dec. 5, 2016, 8 pages.
U.S. Appl. No. 13/940,199, Final Office Action dated Jan. 17, 2017, 48 pages.
U.S. Appl. No. 13/940,199, Non-Final Office Action dated Jun. 16, 2016, 40 pages.
Chinese Application No. 201310049774.9, Office Action dated Dec. 20, 2016, 14 pages. (8 pages of English Translation and 6 pages of original document).
Non-Final Office Action received in U.S. Appl. No. 13/804,944, dated Mar. 27, 2015. 12 pages.
Notice of Allowance received in U.S. Appl. No. 13/804,944, dated Jul. 7, 2015. 10 pages.

* cited by examiner

DEVICE AND METHOD FOR USING TIME RATE OF CHANGE OF SENSOR DATA TO DETERMINE DEVICE ROTATION

CROSS-REFERENCES TO RELATED APPLICATIONS

The present invention claims priority to and is a non-provisional of Application No. 61/907,911 filed Nov. 22, 2013.

This reference is incorporated by reference herein, for all purpose. The present application also incorporates by reference, for all purposes, the following pending patent applications: U.S. patent application Ser. No. 13/760,014, filed Feb., 5, 2013, and U.S. patent application Ser. No. 13/804,944, filed Mar. 13, 2013.

BACKGROUND OF THE INVENTION

The present invention is directed to MEMS (Micro-Electro-Mechanical-Systems). More specifically, various embodiments of the invention provide methods and structures for improving integrated MEMS devices, including inertial sensors and the like.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Blackberry Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving integrated IC devices and MEMS and their methods of use are highly desired.

BRIEF SUMMARY OF THE INVENTION

The present invention is directed to integrated MEMS (Micro-Electro-Mechanical-Systems) IC (Integrated Circuit) devices. More specifically, embodiments of the present invention include methods and structures for improving integrated MEMS sensor devices, such as inertial sensors and magnetic field sensors. Various embodiments of the present invention specifically relate to hardware and software computation of rotational rate data with reduced use of dedicated gyroscope data. More specifically, various embodiments of the present invention relate to MEMS hardware and software emulation of and/or augmentation to a gyroscope sensor.

The use of accelerometer and magnetometer rates of change to augment or replace gyroscopic hardware sensor data is considered to be a novel approach to creating independent rotational information. The inventor believes he has developed a more accurate and responsive means of filtering orientation information and computing rotational rates of an electronic device.

In various embodiments, a combination of sensing and processing of accelerometer and magnetometer data is termed "orientation sensor" computation. Conventional accelerometers and magnetometers are now manufacturable at very low cost, and they consume very little power relative to a true rotation or rotation rate sensor (e.g. gyroscope or "gyro"). Accelerometers and magnetometers are often three-axis devices (e.g. x-axis, y-axis, z-axis) that output three-dimensional vector measurement data in response to the accelerations and magnetic fields being experienced by the device. Typically, when an accelerometer is not being moved around in space, it is still subject to the Earth's gravity field. Accordingly, the accelerometer data (e.g. vectors) returned can define the local vertical direction. Additionally, when a magnetometer is not subject to significant nearby interference sources, it is still subject to the Earth's geomagnetic field. Accordingly, the magnetometer data (e.g. vectors) returned can help define the horizontal and vertical directions. Together, these field measurements can be used to determine the orientation of a sensor cluster, relative to a locally level coordinate system.

While field measurements of acceleration and magnetic flux do not generate any direct indication about rotational rates of a device, they do provide information regarding orientation of the device relative to a local-level coordinate system that is slaved to magnetic north. The time-varying behavior of these measurements can be used, subject to some constraints on motion, to estimate what a real rotation rate sensor (a gyro) would output when placed in the same physical location as the accelerometer and magnetometer. A rotation rate sensor will output angular change per unit time (e.g.: degrees per second) about each of the three perpendicular axes of the device on which it is mounted. Discrete rotation rate sensors also exist, and will estimate rotation rate about just one or two axes when an application requires it.

The inventor recognizes that one shortcoming of an orientation sensor computation is that the instantaneous outputs of the accelerometer and magnetometer can be significantly distorted by magnetic fluctuations (e.g. near-by metal objects, magnets, etc.) and small motions of the device that deflect the gravity vector (e.g. small movement of the hand, shaking of a vehicle, etc.). Accordingly, embodiments of the present invention describes methods for using accelerometer and magnetometer measurements to determine improved rotational rate measurements In some embodiments, the orientation sensor data may be used either to substitute for gyroscopic hardware gyroscopic measurements in a low-cost system, to monitor/augment gyroscopic measurements in a system where gyroscopic hardware signal integrity has to be maintained using independent measurements of rotation; or the like.

According to one aspect of the invention, a computer-implemented method for determining rotational rate of a computer system programmed to perform the method is described. One technique includes determining in a physical perturbation sensor in the computer system, a plurality of instantaneous field measurements with respect to a reference field, at a first time and a second time, and determining in the computer system, a plurality of rates of change associated with the physical perturbation sensor in response to the plurality of instantaneous field measurements at the first time and the second time. A method includes determining in the computer system, an plurality of estimated rotational rates for the computer system in response to the plurality of rates of change, and performing in the computer system, an operation in response se to the plurality of estimated rotational rates.

Many benefits can be derived from one or more embodiments of the present invention. For example, the embodiment of the orientation sensor data used to substitute for gyroscopic hardware gyroscopic measurements provides a means to create a low-cost system with low power consumption due to the utilization of MEMS accelerometer and magnetometer sensors. With the improvements of the present invention to improve rotational rate measurements, such a system would be a viable stand-alone product. Another embodiment using this system to monitor/augment gyroscopic measurements in a gyro system can have the benefit of maintaining gyroscopic hardware signal integrity using independent measurements of rotation.

Various additional objects, features, and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
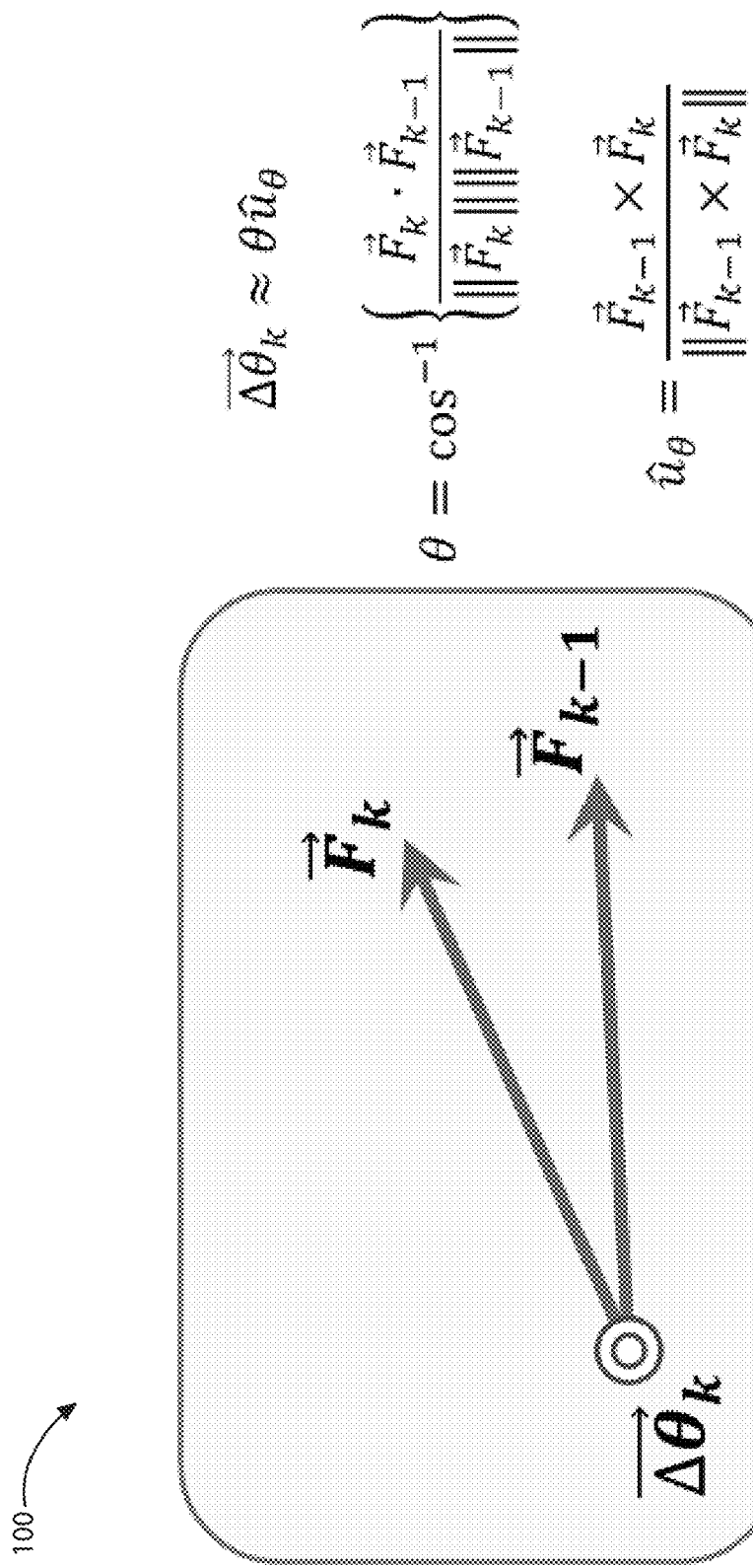
FIG. 1 illustrates a simplified diagram illustrating a method for determining rotational rate of a computer system according to an embodiment of the present invention.

The present invention is directed to integrated MEMS (Micro-Electro-Mechanical-Systems) IC (Integrated Circuit) devices. More specifically, embodiments of the present invention include methods and structures for improving integrated MEMS sensor devices, such as inertial sensors and magnetic field sensors.

Various embodiments of the present invention specifically relate to determination of gyroscope data. More specifically, various embodiments of the present invention relate to MEMS hardware and software emulation of and/or augmentation to a gyroscope sensor.

Some of handheld devices require accurate rotational rate information to support applications for gaming, augmented reality, navigation, and other uses where device orientation with low latency and low noise is required. In some handheld devices, however, dedicated gyroscope hardware are not provided for a variety of reasons, such as cost, space, and the like.

In various embodiments, the inventor of the present invention has considered using time-differenced orientation from accelerometers and magnetometers, to determine rotational rate without the use of gyroscopes. Problems with such an approach, determined by the inventor, include that simple computation of instantaneous orientation using accelerometers and magnetometers outputs can be very noisy. Further, direct filtering of these quantities to an acceptable noise level is often time consuming, and the computed results often have unacceptably high latency.

Another problem is that many applications running upon the handheld device are specifically designed to directly use data from a rotation sensor (e.g. a MEMS gyro), and not computed rotation data (e.g. Euler angles or a direction cosine matrix). Accordingly, intervening software is often required between the sensors and the application to: intercept requests for rotational data from a gyroscope, to compute the rotational data from the acceleration and magnetometer data, and to return the rotational data. This intervening software is typically required to remove the need for special modifications to be made to many software applications.

In light of the above, the inventor desires to provide solutions without the drawbacks discussed above. For example, in one case, the inventor desires to provide an independent (non-gyroscopic) source of rotational rate information to improve the integrity and fault detection of a real gyroscope using an unrelated set of measurements.

In the description below, accelerometer data and magnetometer data are first determined, and then these data are combined and filtered (e.g. noise reduction) to determine the orientation of the device.

In embodiments of the present invention described herein, "field measurements" (and computations) refer to accelerometer measurements (and computations) and/or magnetometer measurements (and computations). In various embodiments, the inventor recognizes that the synthesis of rotation rate information using time-differenced sensor data is similar for accelerometer data and magnetometer data.

Accordingly, in the description below, "field measurements" refer to measurements of accelerometer data and/or magnetometer data.

In some embodiments of the present invention, to convert magnetometer and accelerometer measurements into rotational rate estimates, the field measurement outputs of these sensors can be represented as vectors in three dimensions. The field measurement outputs on each measurement axis of the sensor will generally be changing over time in a way that is dependent on both 1) the current orientation of the device, and 2) on the instantaneous rotation rates about each axis, (e.g. by comparing two or more successive orientation data).

The computation of current orientation using the accelerometer and magnetometer can be accomplished in a number of ways, and exists in a variety of currently fielded products, most notably in consumer handheld devices that support gaming and augmented reality, but also in flight control systems, electronic compasses and other electronic devices where tilt and direction need to be computed from outputs of electronic sensors.

The rotational rate component, which is a quantity traditionally estimated by a separate device (gyro), can be estimated by first recognizing that an angular change in the sensed field vector for either acceleration due to gravity, or magnetic flux due to the geomagnetic field (or any other ambient magnetic field), is typically equal to and opposite of the angular change that would be sensed by a real gyro, per unit time, in the absence of any disturbances to those field measurements. In various embodiments, contributions from measurements from each axis are combined to determine the three-dimensional rotation vector, expressed in the coordinate system of the device, and filtered to reduce or remove the effects of local disturbances to measurements of either the magnetic field or the local gravity vector.

Implementation of this approach can be accomplished either as a computation of discrete contributions from each sensor on each axis, or as a full system of measurement equations that are set up and solved using linear algebra or other mathematical solver principles. In the first approach, a change in the Z- and Y-axis projection of the measured gravity vector implies an X-axis rotation of the device, and this can be applied for each component/axis combination until the three-dimensional rotation is built up in pieces, e.g. change in Z and X axis projection of the gravity vector implies a Y-axis rotation. Additionally, a change in the X- and Y-axis projection of the Earth magnetic field vector implies a Z-axis rotation of the device, and this can be applied for each component/axis combination until the three-dimensional rotation is built up in pieces, e.g. change in Y and Z axis projection of the gravity vector implies an X-axis rotation.

FIG. 1 illustrates a simplified diagram illustrating a method for determining rotational rate of a computer system according to an embodiment of the present invention. One example of an application of a handheld device (e.g. phone, tablet) that may utilize embodiments of the present invention may be a gaming application that simulates a first-person shooter. In such an example, the application may require accurately capturing rotational movements of the device on the order of about 200 degrees-per-second, while also requiring very precise and low noise capturing of smaller rotations. The former may be used for, e.g. player movement in a game running on the device, and the latter may be used for object targeting and tracking in the game. In such embodiments, a filter that was suited to passing these frequencies and the appropriate noise levels would be added between the output of this "virtual" gyro and the input of the sensor data to the application. In other embodiments, an application itself may provide some level of filtering, or the ability to set varying sensitivity to the input rotation rate (gyro) measurements.

In various embodiments, for a given field measurement vector in three dimensions, $\vec{F}_k$, at time a time $t_k$, and a field measurement in three dimensions, $\vec{F}_{k-1}$, at the prior time, $t_{k-1}$, the difference in angle over the sample time, $T_S$, can be computed: $T_S = t_k - t_{k-1}$. In one example, $T_S$ can be found using vector and trigonometric techniques, where one possible approach is illustrated in FIG. 1.

Here, the rotation vector, $\Delta\vec{\theta}_k$, is a three-dimensional indication of an amount of angular rotation, and the direction of the rotational axis. As illustrated above, a magnitude term of the rotational vector can be computed as the inverse cosine of the dot product of the two field vectors, normalized by dividing them by the product of their vector magnitudes. Further, a direction term of the rotational vector can be computed as the vector cross product of the prior field vector and the current one, divided by the magnitude of this cross product such that the result has unity magnitude.

In various embodiments, a continuous-time angular rate of change, $\vec{\omega}_k$, can then be computed as:

$$\vec{\omega}_k \approx \frac{\Delta\vec{\theta}_k}{T_S}$$

Figure 2:
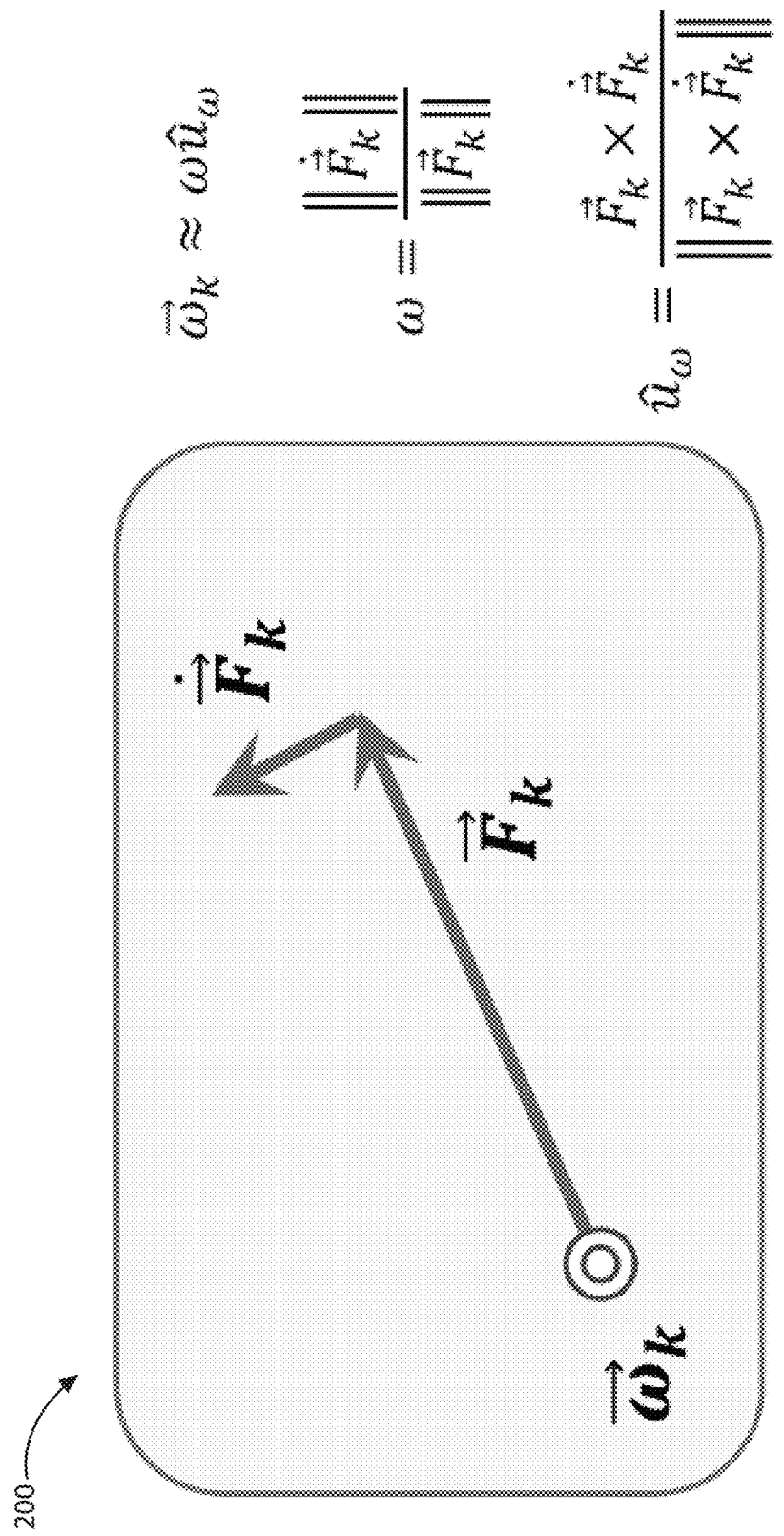
FIG. 2 illustrates a simplified diagram illustrating a method for determining rotational rate of a computer system according to an embodiment of the present invention.

FIG. 2 illustrates a simplified diagram illustrating a method for determining rotational rate of a computer system according to an embodiment of the present invention. In a second approach, the instantaneous accelerometer and magnetometer outputs, as well as their rates of change, can represented as a function of seven variables—roll, pitch, heading, rotational rate on X, rotational rate on Y, rotational rate on Z, and time. This system of equations can be solved either directly or in a more sophisticated process such as a Kalman Filter, and then the variables of interest, the rotational rates on each axis, can be output from the processing. It should also be noted that the roll, pitch and head heading computed in the second approach may have better stability or other characteristics that are desirable when compared to a more traditional orientation computation using only the raw instantaneous accelerometer and magnetometer outputs. Reasons for this include that embodiments of the present invention filter dynamic information using a physical model of rotations on each axis.

The continuous-time angular rate of change, $\vec{\omega}_k$, can also be expressed as a function of the sensor rates of change, if directly available, as shown in FIG. 2.

In various embodiments, given estimates of rotational rates that have been obtained from two independent sensors (e.g. a magnetometer and an accelerometer), a three-dimensional estimate of the rotational rates of the device around each of its axes can be computed. One means of combining these measurements is to decouple them into horizontal and vertical components, where the gravity field is used to sense rotations in the horizontal axes (those perpendicular to the local gravity vector) and rotations in the vertical axis (those parallel to the local gravity vector). An example of this combination of sensors is shown here:

$$\vec{\omega}_{accel\text{-}hor} = \vec{\omega}_{accel} - (\hat{u}_{vert} \cdot \vec{\omega}_{accel})\hat{u}_{vert}$$

$$\vec{\omega}_{mag\text{-}vert} = (\hat{u}_{vert} \cdot \vec{\omega}_{mag}) \hat{u}_{vert}$$

$$\vec{\omega}_{total} = \vec{\omega}_{accel\text{-}hor} + \vec{\omega}_{mag\text{-}vert}$$

In this case, $\hat{u}_{vert}$ represents a current estimate of the local vertical, expressed as a unit vector in the device's local "body" coordinate system. It can be obtained by filtering and normalizing the output of a stationary or near-stationary accelerometer, by using the $3^{rd}$ column of a direction cosine matrix that relates local level coordinates to body coordinates. In other embodiments, this can be by using any other means that yields a vector of unity magnitude that accurately aligns with the local vertical (e.g. gravity). This reference is then used to isolate vertical and horizontal sensor components so that they can be combined in a way that leverages the strengths of both standalone sensors.

In various embodiments, an implementation also isolates the "vertical" components of the accelerometer output and the "non-vertical" components of the magnetometer prior to computing rotational rates. Given such data, in some embodiments, the angular rate estimate will be a straightforward sum of the accelerometer and magnetometer field difference terms, $$\vec{\omega}_{total} = \vec{\omega}_{accel} + \vec{\omega}_{mag}$$

In various embodiments, the measurement of angular rate, or equivalently, the change in angle over a specified time interval, can be used either as a replacement for, or as an independent source of monitoring/error detection for, a conventional gyroscope. The method can be employed whether the "gyro" is a MEMS device as is typical in consumer handheld electronics, an alternate rotation sensing technology (e.g. Fiber Optic Gyro or "FOG"), or the like. Since the rotation computation relies largely on software that uses sensor data to synthesize an output that has properties of a different type of sensor, this can also be termed a "virtual gyro" for purposes of sensor classification and identification.

In various embodiments, the "virtual gyro" data may be combined with actual gyroscopic-hardware gyroscopic data to output higher quality gyroscopic data. With or without actual gyroscopic data, the determined gyroscopic data may be used as input to one or more applications running upon a handheld device. Such applications may include a game, e.g. driving game, flying game, shooter game; an application, e.g. a driving or flying recorder, an augmented reality program (e.g. GoogleGlass), a leveling program; and the like. In various embodiments, the application may update the display presented to the user in response to the determined gyroscope data, such as updating a map; accessing and displaying new advertisement/sponsorship data (e.g. advertisements based upon location); retrieving and displaying data from a social network (e.g. direction of friends, locations of recommended locations, etc.); and the like. In view of the present patent disclosure, it is expected that one of ordinary skill in the art will understand that many other variations are contemplated and enabled by this disclosure.

Figure 3A:
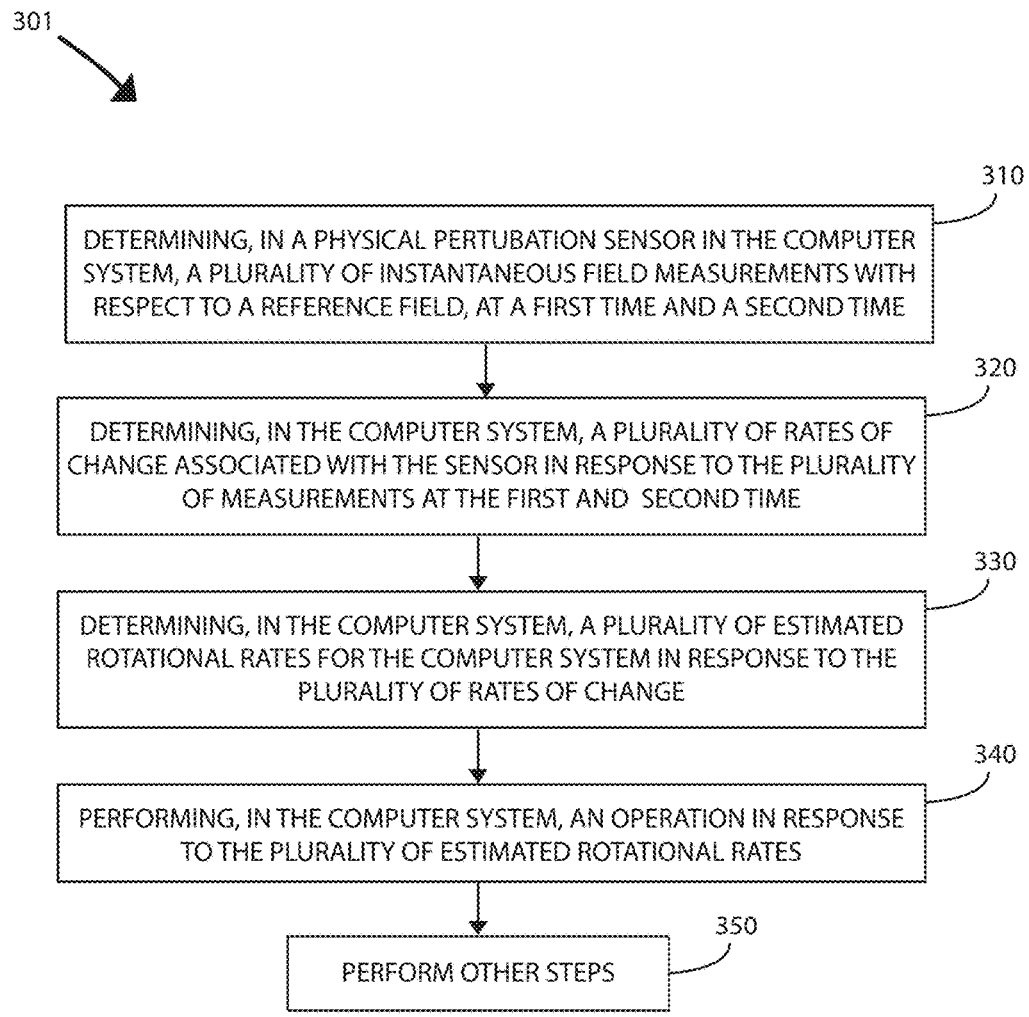
FIG. 3A illustrates a simplified flow diagram of a method for determining rotational rate of a computer system according to an embodiment of the present invention.

FIG. 3A illustrates a simplified flow diagram of a method for determining rotational rate of a computer system according to an embodiment of the present invention. This method can be an example of a stand-alone system for determining rotational rate without a gyro sensor. As shown, the method 301 can include the following steps:

310. determine, in a physical perturbation sensor in the computer system, a plurality of instantaneous field measurements with respect to a reference field, at a first time and a second time;

320. determine, in the computer system, a plurality of rates of change associated with the physical perturbation sensor in response to the plurality of instantaneous field measurements at the first time and the second time;

330. determine, in the computer system, a plurality of estimated rotational rates for the computer system in response to the plurality of rates of change;

340. perform, in the computer system, an operation in response to the plurality of estimated rotational rates; and 350. Other steps as desired.

These steps are merely examples and should not unduly limit the scope of the claims herein. One of ordinary skill in the art would recognize many other variations, modifications, and alternatives. For example, various steps outlined above may be added, removed, modified, rearranged, repeated, and/or overlapped, as contemplated within the scope of the invention.

In an embodiment, the present invention provides a method for determining angular rotation data of a MEMS inertial sensor system. The method 301 can include determining, in a physical perturbation sensor in the computer system, a plurality of instantaneous field measurements with respect to a reference field at a first time and a second time, step 310. In a specific embodiment, the physical perturbation sensor can include an accelerometer, a magnetometer, or other MEMS sensor device and the like. The reference field can include a global gravity field, a global magnetic field, or other applicable field type.

A plurality of rates of change associated with the physical perturbation sensor can also be determined, in the system, in response to the plurality of instantaneous field measurements and the first and second times, step 320. In a specific embodiment, this process of determination can include filtering, in the computer system, the plurality of instantaneous field measurements at the first and second times. A plurality of estimated rotational rates for the computer system can be determined, in the system, in response to the plurality rates of change, step 330, and an operation can be performed in response to the plurality of estimated rotational rates, step 340. Other steps can be performed as desired, step 350.

Figure 3B:
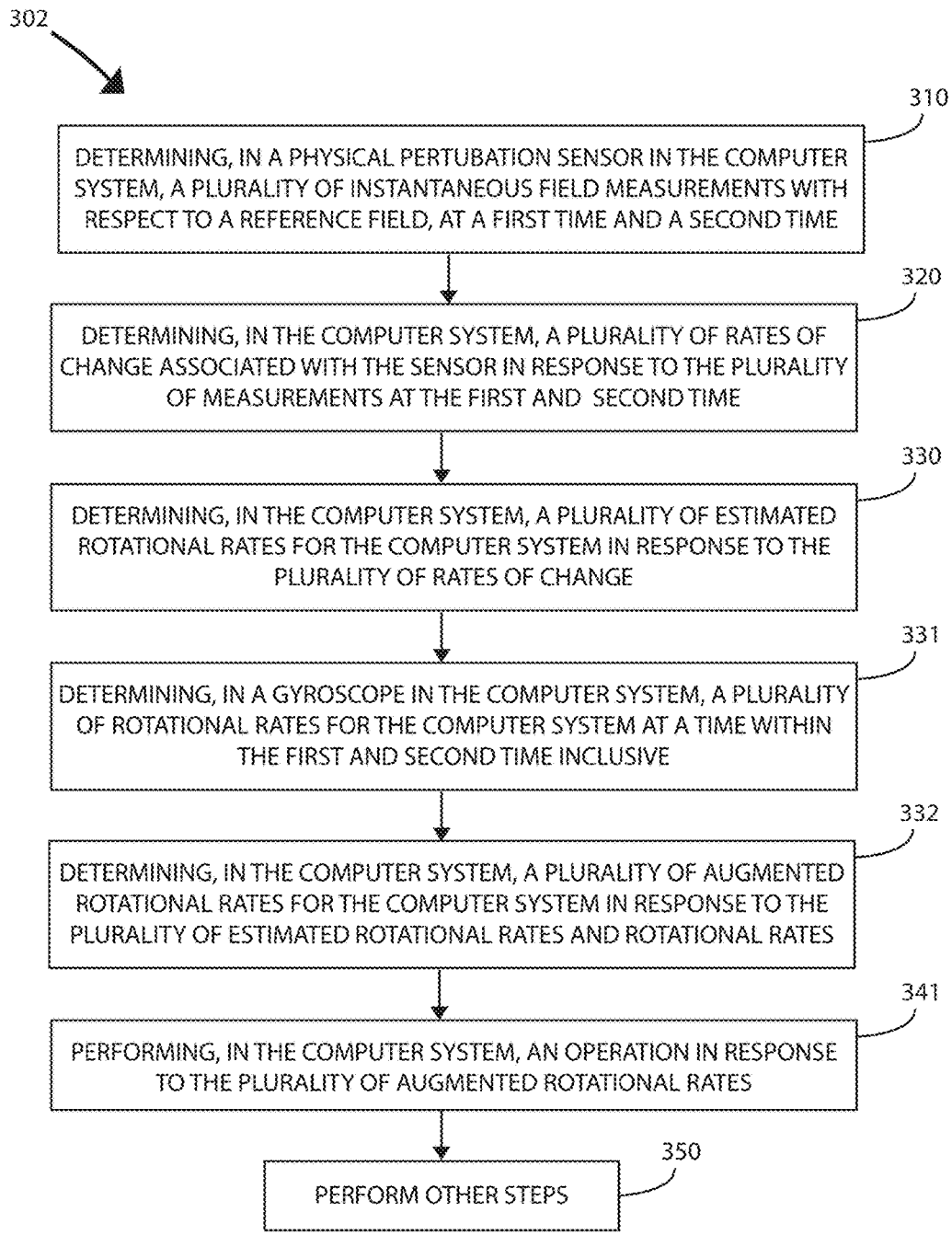
FIG. 3B illustrates a simplified flow diagram of a method for determining rotational rate of a computer system according to an embodiment of the present invention.

FIG. 3B illustrates a simplified flow diagram of a method for determining rotational rate of a computer system according to an embodiment of the present invention. This method can be an example of an augmented system for determining rotational rate using an accelerometer, a magnetometer, and a gyro sensor. As shown, the method 302 can include the following steps:

310. determine, in a physical perturbation sensor in the computer system, a plurality of instantaneous field measurements with respect to a reference field, at a first time and a second time;

320. determine, in the computer system, a plurality of rates of change associated with the physical perturbation sensor in response to the plurality of instantaneous field measurements at the first time and the second time;

330. determine, in the computer system, a plurality of estimated rotational rates for the computer system in response to the plurality of rates of change;

331. determine, in a gyroscope in the computer system, a plurality of rotational rates for the computer system at a time within the first time and the second time inclusive;

332. determine, in the computer system, a plurality of augmented rotational rates for the computer system in response to the plurality of estimated rotational rates and the plurality of rotational rates;

341. perform, in the computer system, an operation in response to the plurality of augmented rotational rates; and 350. Other steps as desired.

These steps are merely examples and should not unduly limit the scope of the claims herein. One of ordinary skill in the art would recognize many other variations, modifications, and alternatives. For example, various steps outlined above may be added, removed, modified, rearranged, repeated, and/or overlapped, as contemplated within the scope of the invention.

In an embodiment, the present invention provides a method for determining angular rotation data of a MEMS inertial sensor system. Compared to method 301, method 302 includes the additional steps 331 and 332. Step 331 involves determining, in a gyroscope in the computer system, a plurality of rotational rates for the computer system at a time within the first time and the second time inclusive. Step 332 involves determining, in the computer system, a plurality of augmented rotational rates for the computer system in response to the plurality of estimated rotational rates and the plurality of rotational rates.

Following these two steps, an operation can be performed, in the computer system, in response to the plurality of augmented rotational rates, step 341. In a specific embodiment, the operation here responds to the estimated rates from an accelerometer and a magnetometer as well as the rates from a gyro sensor. Other steps can be performed as desired, step 350.

Figure 3C:
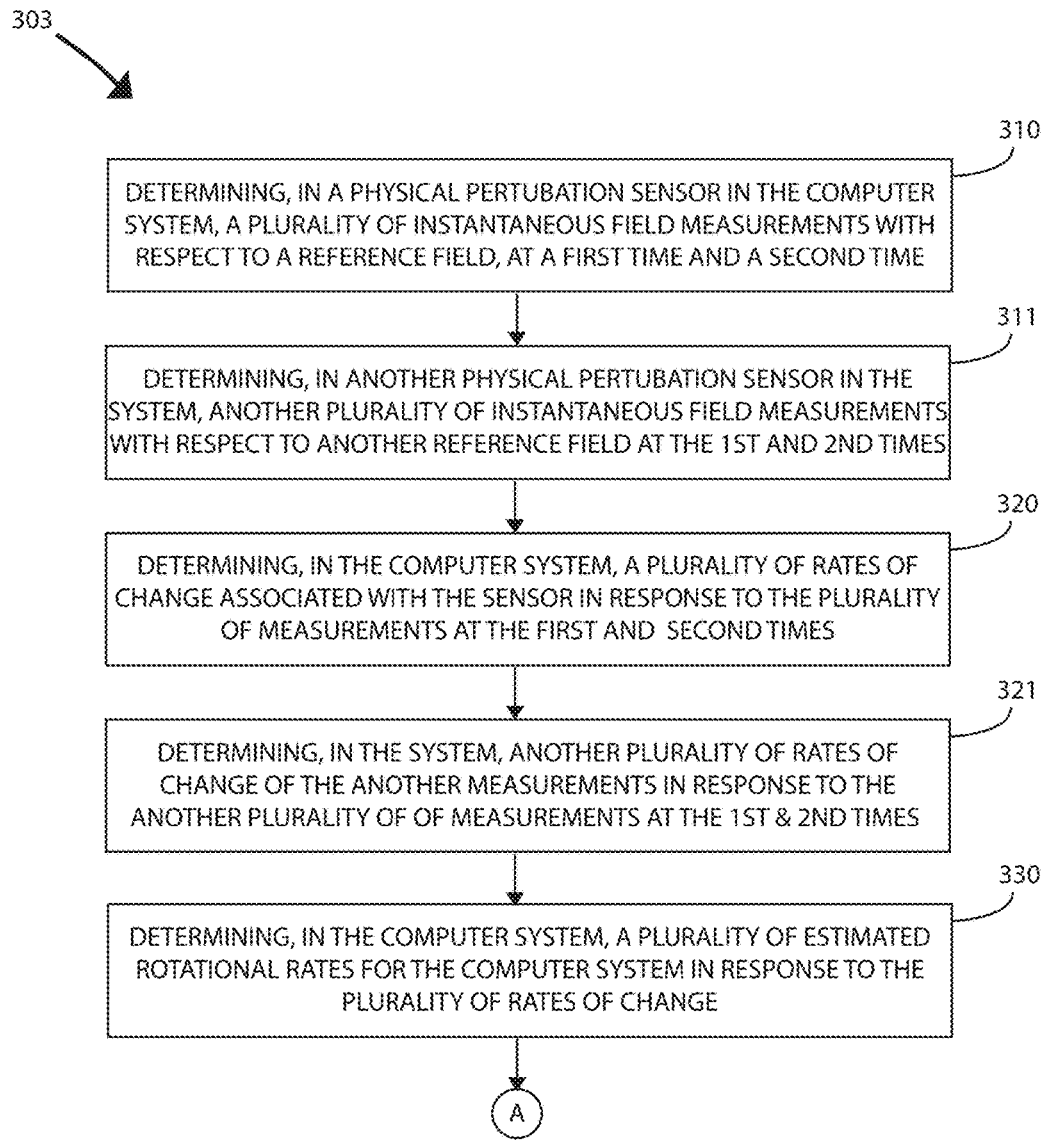
FIGS. 3C and 3D illustrate a simplified flow diagram of a method for determining rotational rate of a computer system according to an embodiment of the present invention.
Figure 3D:
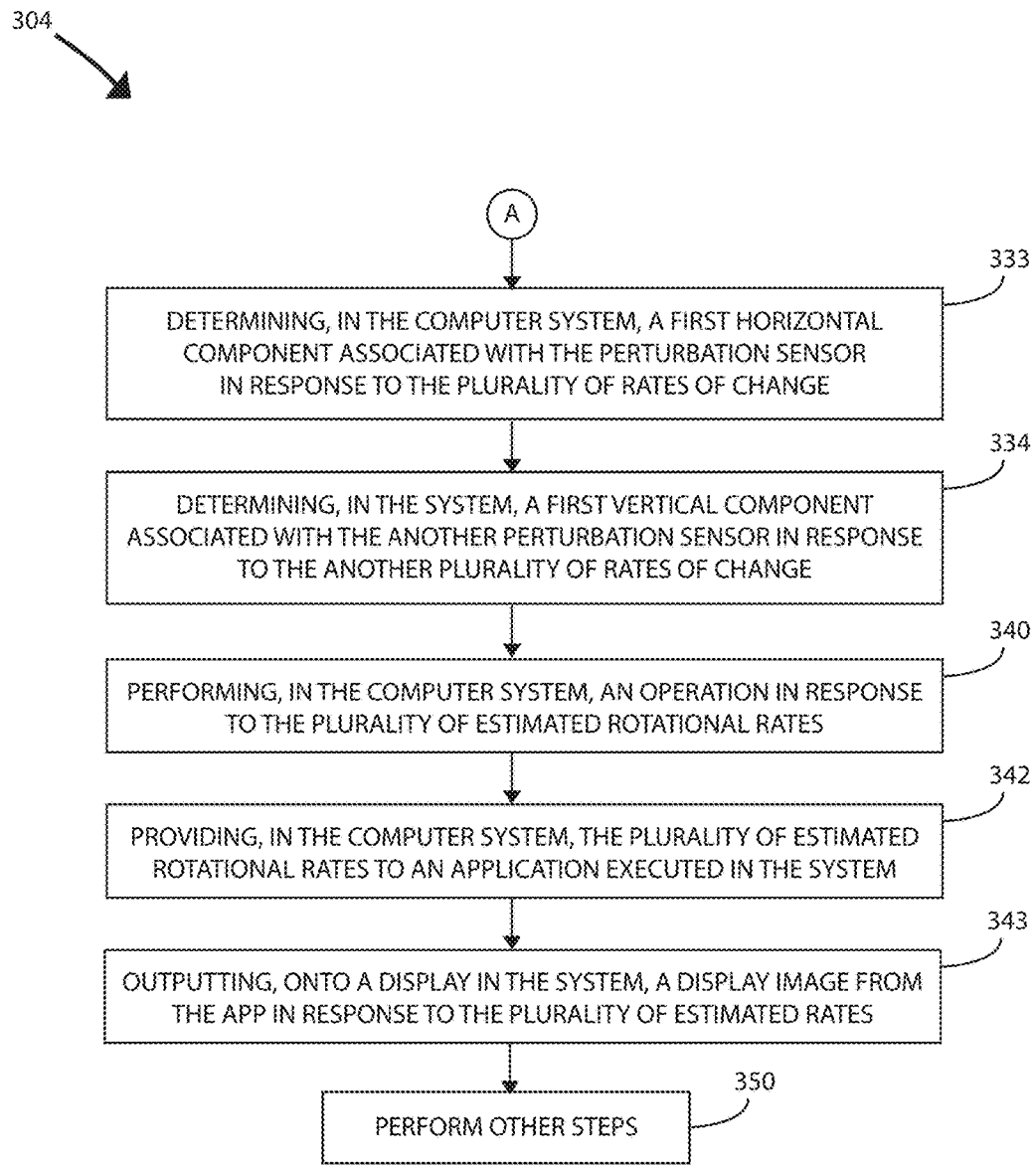

FIG. 3C illustrates a simplified flow diagram of a method for determining rotational rate of a computer system according to an embodiment of the present invention. This method can be another example of using more than one physical perturbation sensor in determining angular rate in a computer system. As shown, the method 302 can include the following steps:

310. determine, in a physical perturbation sensor in the computer system, a plurality of instantaneous field measurements with respect to a reference field, at a first time and a second time;

311. determine, in another physical perturbation sensor in the computer system, another plurality of instantaneous field measurements with respect to another reference field, at the first time and the second time;

320. determine, in the computer system, a plurality of rates of change associated with the physical perturbation sensor in response to the plurality of instantaneous field measurements at the first time and the second time;

321. determine, in the computer system, another plurality of rates of change of the another plurality of instantaneous field measurements, in response to the another plurality of instantaneous field measurements at the first time and the second time;

330. determine, in the computer system, a plurality of estimated rotational rates for the computer system in response to the plurality of rates of change;

333. determine, in the computer system a first horizontal component associated with the perturbation sensor in response to the plurality of rates of change;

334. determine, in the computer system a first vertical component associated with the another perturbation sensor in response to the another plurality of rates of change;

340. perform, in the computer system, an operation in response to the plurality of estimated rotational rates;

342. provide, in the computer system, the plurality of estimated rotational rates to an application executed in the computer system;

343. output, onto a display in the computer system, a display image from the application in response to the plurality of estimated rotational rates; and 350. Other steps as desired.

These steps are merely examples and should not unduly limit the scope of the claims herein. One of ordinary skill in the art would recognize many other variations, modifications, and alternatives. For example, various steps outlined above may be added, removed, modified, rearranged, repeated, and/or overlapped, as contemplated within the scope of the invention.

In an embodiment, the present invention provides a method for determining angular rotation data of a MEMS inertial sensor system. Method 303 and 304 comprise a method joined by the "A" marker to show continuity. Method 303 begins with the same step 310 as method 301, but also includes determining, in another physical perturbation sensor in the computer system, another plurality of instantaneous field measurements with respect to another reference field at the first and second times, step 311. In a specific embodiment, the physical sensor, which can be a first physical perturbation sensor, can include an accelerometer, while the another sensor, which can be a second physical perturbation sensor, can include a magnetometer. In this case, the reference field includes gravity and the another reference field includes a global magnetic field.

Method 303 also includes the same step 320 as in method 301, but also includes determining, in the computer system, another plurality of rates of change of the another plurality of instantaneous field measurements in response to the another plurality of instantaneous field measurements at the first and second times, step 321. In this case, the determining of the plurality of estimated rotational rates for the computer system is in response to the plurality of rates of change and to the another plurality of rate of change.

A plurality of estimated rotation rates for the computer system can be determined in response to the plurality of rates of change, step 330. In a specific embodiment, step 330 can include determining, in the computer system, a first horizontal component associated with the perturbation sensor in response to the plurality of rates of change, step 333. Step 330 can also include determining, in the computer system, a first vertical component associated with the another perturbation sensor in response to the plurality of rates of change, 334. In this case, the process of determination of the estimated rotational rates is in response to the first horizontal and vertical components.

An operation can be performed in response to the plurality of estimated rotational rates, step 340. Step 340 can include providing, in the computer system, the plurality of estimated rotational rates to an application executed in the computer system, step 342. Step 340 can also include outputting, onto a display in the computer system, a display image from the application in response to the plurality of estimated rotational rates, step 343. Other steps can also be performed as desired, step 350.

Figure 4:
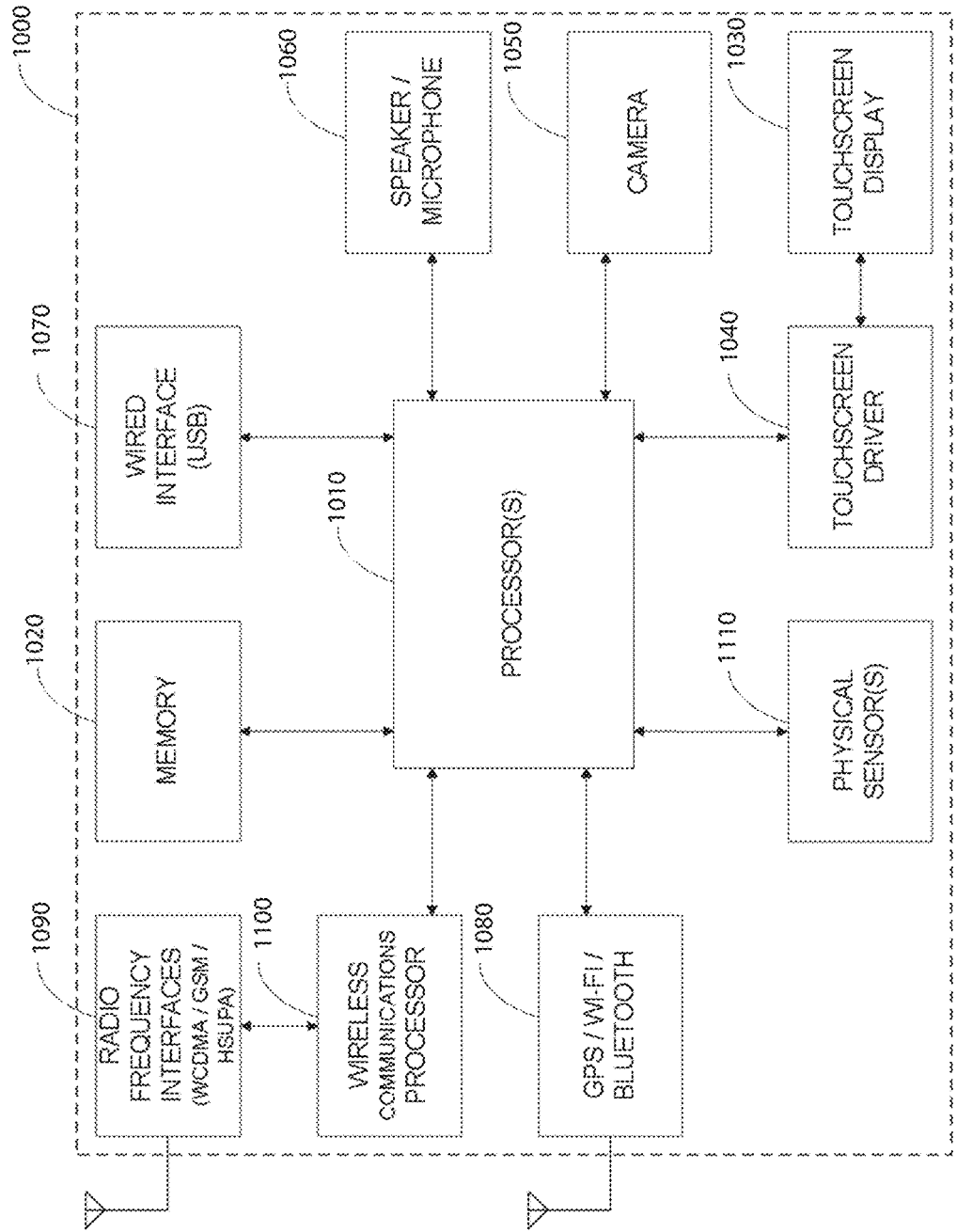
FIG. 4 illustrates a simplified functional block diagram of various embodiments of the present invention.

FIG. 4 illustrates a functional block diagram of various embodiments of the present invention. In FIG. 4, a computing device 1000 typically includes an applications processor 1010, memory 1020, a touch screen display 1030 and driver 1040, an image acquisition device 1050, audio input/output devices 1060, and the like. Additional communications from and to computing device are typically provided by via a wired interface 1070, a GPS/Wi-Fi/Bluetooth interface 1080, RF interfaces 1090 and driver 1100, and the like. Also included in various embodiments are physical sensors 1110.

In various embodiments, computing device 1000 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 1000 may include one or more processors 1010. Such processors 1010 may also be termed application processors, and may include a processor core, a video/graphics core, and other cores. Processors 1010 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR -SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 1020 may include different types of memory (including memory controllers), such as flash memory (e.g. NOR, NAND), pseudo SRAM, DDR SDRAM, or the like. Memory 1020 may be fixed within computing device 1000 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 1030 and driver 1040 may be based upon a variety of later-developed or current touch screen technology including resistive displays, capacitive displays, optical sensor displays, electromagnetic resonance, or the like. Additionally, touch screen display 1030 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 1050 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 1060 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 1010 to enable the user to operate computing device 1000 by stating voice commands. Additionally, a speech engine may be provided in various embodiments to enable computing device 1000 to provide audio status messages, audio response messages, or the like.

In various embodiments, wired interface 1070 may be used to provide data transfers between computing device 1000 and an external source, such as a computer, a remote server, a storage network, another computing device 1000, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 1080 may also be provided to provide wireless data transfers between computing device 1000 and external sources, such as computers, storage networks, headphones, microphones, cameras, or the like. As illustrated in FIG. 10, wireless protocols may include Wi-Fi (e.g. IEEE 802.11 a/b/g/n, WiMax), Bluetooth, IR and the like.

GPS receiving capability may also be included in various embodiments of the present invention, however is not required. As illustrated in FIG. 10, GPS functionality is included as part of wireless interface 1080 merely for sake of convenience, although in implementation, such functionality is currently performed by circuitry that is distinct from the Wi-Fi circuitry and distinct from the Bluetooth circuitry.

Additional wireless communications may be provided via RF interfaces 1090 and drivers 1100 in various embodiments. In various embodiments, RF interfaces 1090 may support any future-developed or conventional radio frequency communications protocol, such as CDMA-based protocols (e.g. WCDMA), GSM-based protocols, HSUPA-based protocols, or the like. In the embodiments illustrated, driver 1100 is illustrated as being distinct from applications processor 1010. However, in some embodiments, these functionality are provided upon a single IC package, for example the Marvel PXA330 processor, and the like. It is contemplated that some embodiments of computing device 1000 need not include the RF functionality provided by RF interface 1090 and driver 1100.

FIG. 4 also illustrates computing device 1000 to include physical sensors 1110. In various embodiments of the present invention, physical sensors 1110 can be single axis or multi-axis Micro-Electro-Mechanical Systems (MEMS) based devices being developed by M-cube, the assignee of the present patent application. Physical sensors 1110 can include accelerometers, gyroscopes, pressure sensors, magnetic field sensors, bio sensors, and the like. In other embodiments of the present invention, conventional physical sensors 1110 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7), Google Android (e.g. 2.2), Symbian, or the like. In various embodiments of the present invention, the operating system may be a multi-threaded multi-tasking operating system. Accordingly, inputs and/or outputs from and to touch screen display 1030 and driver 1040 and inputs/or outputs to physical sensors 1110 may be processed in parallel processing threads. In other embodiments, such events or outputs may be processed serially, or the like. Inputs and outputs from other functional blocks may also be processed in parallel or serially, in other embodiments of the present invention, such as image acquisition device 1050 and physical sensors 1110.

FIG. 4 is representative of one computing or microprocessing device 1000 capable of embodying the present invention. The previously described methods of operation can be implemented with on-chip logic or through a microprocessor in the same device or in a separate chip within the hand-held device. It will be readily apparent to one of ordinary skill in the art that many other hardware and software configurations are suitable for use with the present invention. Embodiments of the present invention may include at least some but need not include all of the functional blocks illustrated in FIG. 4. For example, in various embodiments, computing device 1000 may lack image acquisition unit 1050, or RF interface 1090 and/or driver 1100, or GPS capability, or the like. Additional functions may also be added to various embodiments of computing device 1000, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

In an embodiment, the present invention provides a computer system programmed to determine a rotational rate. This system can include several components. One component can include a physical perturbation sensor configured to output a plurality of instantaneous field measurements with respect to a reference field at a first time and a second time. The physical perturbation sensor can include an accelerometer, a magnetometer, or any MEMS sensor device, and the like. The reference field can include a global gravity field, a global magnetic field, or other measurable field.

Another component can include a processor coupled to the physical perturbation sensor. This processor can be configured to receive the plurality of instantaneous field measurements and to determine a plurality of rates of change associated with the physical perturbation sensor in response to the plurality of instantaneous field measurements at the first and second times. The processor can be programmed to determine a plurality of estimated rotation rates for the computer system in response to the plurality of rates of change and also perform an operation in response to the plurality of estimated rotational rates. In this case, the processor is configured to perform a method similar to that described for FIG. 3A.

In a specific embodiment, this system can also include a gyroscope configured to output a plurality of rotational rates for the computer system at the first and second times inclusive. In this embodiment, the processor is programmed to determine a plurality of augmented rotational rates for the computer system in response to the plurality of estimated rotational rates and the rotational rates. In this case, the processor is configured to perform a method similar to that described for FIG. 3B.

In another specific embodiment, the system can also include another physical perturbation sensor configured to determine another plurality of instantaneous field measurements with respect to another reference field at the first and second times. The processor can be programmed to determine another plurality of rates of change of the other plurality of instantaneous field measurements in response to the other plurality of instantaneous field measurements at the first and second times. In this case, the processor is programmed to determine the plurality of estimated rotational rates for the computer system in response to the plurality of rates of change and to the another plurality of rates of change.

In this embodiment, the perturbation sensor, which can be a first perturbation sensor, can include an accelerometer while the second physical perturbation sensor, which can be a second perturbation sensor, can include a magnetometer. The reference field can include a global gravity field while the another reference field can include a global magnetic field.

Furthermore, the processor can be programmed to determine a first horizontal component associated with the first perturbation sensor in response to the plurality of rates of change. The processor can also be programmed to determine a first vertical component associated within the second perturbation sensor in response to the other plurality of rates of change. In this case, the processor is programmed to determine the plurality of estimated rotational rates for the computer system in response to the first horizontal and vertical components.

Performing an operation in the processor can include additional programmed commands and components. The processor can be programmed to provide the plurality of estimated rotation rates to an application running in the processor. The processor can be programmed to determine output image parameters, using the application, in response to the plurality of estimated rotational rates. The computer system can include a display configured to display an image in response to the output image parameters.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for determining an angular rate of change of a rotational vector of a handheld device, comprising:
    measuring, using an accelerometer in the handheld device, a first gravity field measurement at a first time and a second gravity field measurement at a second time;
    measuring, using a magnetometer in the handheld device, a first magnetic field measurement at a first time and a second magnetic field measurement at a second time;
    computing, in the handheld device, a first rotation vector based on the first gravity field measurement and the second gravity field measurement;
    computing, in the handheld device, a first angular rate of change based on the first rotation vector, the first time, and the second time;
    computing, in the handheld device, a second rotation vector based on the first gravity field measurement and the second gravity field measurement;

computing, in the handheld device, a second angular rate of change based on the second rotation vector, the first time, and the second time; and computing a combined angular rate of change based on the first angular rate of change and the second angular rate of change, without gyroscopic measurement.

2. The method of claim 1, further comprising:

computing a vertical component of the first angular rate of change based on accelerometer measurement; and computing a horizontal component of the second angular rate of change based on magnetometer measurement.

3. The method of claim 2, further comprising computing a combined angular rate of change based on the vertical component of the first angular rate of change and the horizontal component of the second angular rate of change, without gyroscopic measurement.

4. The method of claim 1, further comprising:

measuring the first gravity field measurement and the second gravity field measurement with respect to a gravity field; and measuring the first magnetic field measurement and the second magnetic field measurement with respect to a magnetic field.

5. The method of claim 1, further comprising providing the combined angular rate of change as input to one or more of games, applications, and updating a display of the handheld device.

6. A handheld device, comprising:

a processor;

an accelerometer;

a magnetometer; and a display;

wherein the handheld device is configured to determine an angular rate of change of a rotational vector of the handheld device without gyroscopic measurement, by:

measuring, using an accelerometer in the handheld device, a first gravity field measurement at a first time and a second gravity field measurement at a second time;

measuring, using the magnetometer in the handheld device, a first magnetic field measurement at a first time and a second magnetic field measurement at a second time;

computing, in the handheld device, a first rotation vector based on the first gravity field measurement and the second gravity field measurement;

computing, in the handheld device, a first angular rate of change based on the first rotation vector, the first time, and the second time;

computing, in the handheld device, a second rotation vector based on the first gravity field measurement and the second gravity field measurement;

computing, in the handheld device, a second angular rate of change based on the second rotation vector, the first time, and the second time; and computing a combined angular rate of change based on the first angular rate of change and the second angular rate of change, without gyroscopic measurement.

7. The handheld device of claim 6, wherein the handheld device is configured to:

compute a vertical component of the first angular rate of change based on accelerometer measurement; and compute a horizontal component of the second angular rate of change based on magnetometer measurement.

8. The handheld device of claim 7, wherein the handheld device is configured to compute a combined angular rate of change based on the vertical component of the first angular rate of change and the horizontal component of the second angular rate of change, without gyroscopic measurement.

9. The handheld device of claim 6, wherein the handheld device is configured to:

measure the first gravity field measurement and the second gravity field measurement with respect to a gravity field; and measure the first magnetic field measurement and the second magnetic field measurement with respect to a magnetic field.

10. The handheld device of claim 6, wherein the handheld device is configured to provide the combined angular rate of change as input to one or more of games, applications, and updating a display of the handheld device.

* * * * *